US011138708B2

(12) United States Patent
Moon et al.

(10) Patent No.: US 11,138,708 B2
(45) Date of Patent: Oct. 5, 2021

(54) METHOD AND APPARATUS FOR RECONSTRUCTING CONTENT IMAGE DATA

(71) Applicant: Markany Inc., Seoul (KR)

(72) Inventors: Ji Seop Moon, Seoul (KR); Min Soo Park, Uiwang-si (KR); Dong Young Lee, Seoul (KR); So Won Kim, Seoul (KR); Tai Yoon Lee, Seoul (KR)

(73) Assignee: Markany Inc., Seoul (KR)

( * ) Notice: Subject to any disclaimer, the term of this patent is extended or adjusted under 35 U.S.C. 154(b) by 30 days.

(21) Appl. No.: 16/533,732

(22) Filed: Aug. 6, 2019

(65) Prior Publication Data

US 2020/0051227 A1    Feb. 13, 2020

(30) Foreign Application Priority Data

Aug. 7, 2018 (KR) .................. 10-2018-0091565

(51) Int. Cl.
*G06T 5/50* (2006.01)
*G06T 3/60* (2006.01)
(Continued)

(52) U.S. Cl.
CPC .............. *G06T 5/50* (2013.01); *G06T 1/005* (2013.01); *G06T 3/0006* (2013.01); *G06T 3/40* (2013.01);
(Continued)

(58) Field of Classification Search
CPC ........... G06T 5/50; G06T 3/60; G06T 3/0006; G06T 1/005; G06T 3/40;
(Continued)

(56) References Cited

U.S. PATENT DOCUMENTS

| 6,266,452 B1 * | 7/2001 | McGuire | G06K 9/32 |
| | | | 382/280 |
| 2012/0162454 A1 * | 6/2012 | Park | G06T 7/238 |
| | | | 348/208.6 |

(Continued)

FOREIGN PATENT DOCUMENTS

| CN | 106503491 A | * | 3/2017 | ............... G06T 1/00 |
| JP | 3573198 B2 | * | 10/2004 | ............... G06T 3/00 |

OTHER PUBLICATIONS

Mathworks, "Linear mapping method using affine transformation" MATLAB & Simulink (Year: 2016).*

(Continued)

*Primary Examiner* — Sumati Lefkowitz
*Assistant Examiner* — Dalen O Goodson
(74) *Attorney, Agent, or Firm* — Invenstone Patent, LLC

(57) ABSTRACT

Provided is a method for reconstructing content image data. The method includes selecting a first point and a second point in a first image of first content, selecting a third point and a fourth point in a second image of second content (the second image is an image corresponding to the first image and the third point and the fourth point are points in an image corresponding to the first point and the second point, respectively), generating a first reference vector using the first point and the second point, generating a second reference vector using the third point and the fourth point, calculating a rotation, scale, and transformation (RST) value from the first image to the second image using the first reference vector and the second reference vector; and reconstructing the second content using the calculated RST value.

17 Claims, 10 Drawing Sheets

(51) Int. Cl.
  *G06T 3/00* (2006.01)
  *G06T 1/00* (2006.01)
  *G06T 3/40* (2006.01)

(52) U.S. Cl.
  CPC ........ *G06T 3/60* (2013.01); *G06T 2201/0065* (2013.01)

(58) Field of Classification Search
  CPC ..... G06T 2201/0065; G06T 2201/0081; G06T 1/0064; G06T 3/0075
  See application file for complete search history.

(56) References Cited

U.S. PATENT DOCUMENTS

| | | | | |
|---|---|---|---|---|
| 2015/0071565 A1* | 3/2015 | Sharma | ................ | G06K 9/6206 382/276 |
| 2015/0170331 A1* | 6/2015 | Xu | ........................ | G06T 3/4038 382/276 |
| 2017/0186212 A1* | 6/2017 | Ai | .......................... | G06F 16/54 |

OTHER PUBLICATIONS

Stack Exchange "Calculating translation value and rotation angle of a rotated 2D image using MATLAB" (Year: 2015).*

* cited by examiner

FAIL TO EXTRACT IMAGE FEATURE INFORMATION

FIG. 5

$$\begin{pmatrix} x' \\ y' \\ 1 \end{pmatrix} = RST \begin{pmatrix} x \\ y \\ 1 \end{pmatrix} \qquad R = \begin{pmatrix} \cos\theta & \cos\theta & 0 \\ -\sin\theta & -\sin\theta & 0 \\ 0 & 0 & 1 \end{pmatrix}$$

$$S = \begin{pmatrix} S_x & 0 & 0 \\ 0 & S_y & 0 \\ 0 & 0 & 1 \end{pmatrix}$$

$$T = \begin{pmatrix} 1 & 0 & T_x \\ 0 & 1 & T_y \\ 0 & 0 & 1 \end{pmatrix}$$

FIG. 6

$$\overrightarrow{v(org)} \cdot \overrightarrow{v(trg)} = |\overrightarrow{v(org)}||\overrightarrow{v(trg)}|\cos\theta$$

$$= \overrightarrow{v(org)} \cdot \overrightarrow{v(trg)} = |\overrightarrow{v(org)}||\overrightarrow{v(trg)}|\cos\theta$$

$$= x_{org}x_{trg} + y_{org}y_{trg}$$

$$= \sqrt{x_{org}^2 + y_{org}^2}\sqrt{x_{trg}^2 + y_{trg}^2}\cos\theta$$

$$\therefore \cos\theta = \frac{x_{org}x_{trg} + y_{org}y_{trg}}{\sqrt{x_{org}^2 + y_{org}^2}\sqrt{x_{trg}^2 + y_{trg}^2}}$$

$\overrightarrow{v(trg)} = (x_{trg}, y_{trg})$ $\overrightarrow{v(org)} = (x_{org}, y_{org})$ 612, 622, 630

METHOD AND APPARATUS FOR RECONSTRUCTING CONTENT IMAGE DATA

CROSS-REFERENCE TO RELATED APPLICATIONS

This application claims the benefit of priority of Korean Patent Application No. 10-2018-0091565 filed on Aug. 7, 2018, all of which are incorporated by reference in their entirety herein.

BACKGROUND OF THE INVENTION

Field of the Invention

The present invention relates to a method and apparatus for reconstructing image and video data, and more particularly, to a method for reconstructing content image data with degraded resolution and image quality from an ultra-high-definition content.

Related Art

As content sharing channels, such as a social network service (SNS), are recently diversified, it becomes more difficult to manage the copyright of content It is difficult to recognize original content and it is not easy to reconstruct degraded content into the original content because the original content is deformed and degraded due to capture and camcoding during the sharing.

FIG. 1 is a diagram illustrating a situation in which image feature information is extracted in the state in which original content is degraded during sharing.

Referring to FIG. 1, if a continuous feature code (CFC), that is, motion picture DNA information, is to be extracted from motion picture content having resolution and image quality degraded during sharing (in general, content having degraded resolution and including an image deformed in a distorted form), it is not easy to extract the continuous feature code. Although the continuous feature code is extracted, the extracted information often becomes useless information because it does not correspond to that of the original content. In addition, even a watermark embedded in the degraded content is not easily detected, and therefore there is an urgent need to efficiently reconstruct the degraded content into the original content.

SUMMARY OF THE INVENTION

The present invention provides a method and apparatus for reconstructing target content with degraded resolution and image quality by extracting a reference vector from specific images of the target content and original content, calculating a rotation scale and transformation (RST) value for image correction based on the extracted reference vector, and using the calculated RST value.

In an aspect, a method for reconstructing content image data is provided. The method includes selecting a first point and a second point in a first image of first content, selecting a third point and a fourth point in a second image of second content (the second image is an image corresponding to the first image and the third point and the fourth point are points in an image corresponding to the first point and the second point, respectively), generating a first reference vector using the first point and the second point, generating a second reference vector using the third point and the fourth point, calculating a rotation, scale, and transformation (RST) value from the first image to the second image using the first reference vector and the second reference vector; and reconstructing the second content using the calculated RST value.

The first point and the second point may include a feature point characterizing an object in the first image, and the third point and the fourth point may include a feature point characterizing an object in the second image.

The selecting of the first point and the second point in the first image of the first content and the selecting of the third point and the fourth point in the second image of the second content may include detecting a plurality of feature points in the first image and the second image, selecting a plurality of feature points matched in the first image and the second image among the plurality of detected feature points; and selecting the first point, the second point, the third point, and the fourth point among the plurality of selected feature points.

The selecting of the first point, the second point, the third point, and the fourth point among the plurality of selected feature points may include selecting two feature points, which are farthest from each other in the first image and the second image, respectively, among the plurality of selected feature points as the first point, the second point, the third point, and the fourth point.

The calculating of the RST value may include calculating a rotation value (R value) using a scalar product operation based on the first reference vector and the second reference vector.

The rotation value may be calculated using calculated using $$\cos\theta = \frac{x_{org}x_{trg} + y_{org}y_{trg}}{\sqrt{x_{org}^2 + y_{org}^2}\sqrt{x_{trg}^2 + y_{trg}^2}},$$

and in the above Equation, θ may represent an angle between the first reference vector and the second reference vector, $x_{org}$ may represent an x value of the first reference vector, $y_{org}$ may represent a y value of the first reference vector, $x_{trg}$ may represent an x value of the second reference vector, and $y_{trg}$ may represent a y value of the second reference vector.

The calculating of the RST value may include correcting the second reference vector based on the rotation value (R value) from the first image to the second image, and calculating a scale value (S value) based on a size of an x coordinate system and a size of a y coordinate system of the first reference vector and the corrected second reference vector.

The scale value may be calculated using $$S_x = \frac{x_{trg}}{x_{org}}, \quad S_y = \frac{y_{trg}}{y_{org}},$$

and in the above Equation, $S_x$ may represent a scale value on an x axis, $S_y$ may represent a scale value on a y axis, $x_{org}$ may represent an x value of the first reference vector, $y_{org}$ may represent a y value of the first reference vector, $x_{trg}$ may represent an x value of the corrected second reference vector, and $y_{trg}$ may represent a y value of the corrected second reference vector.

The calculating of the RST value may include correcting the second reference vector based on the rotation value (R value) and the scale value (S value) from the first image to the second image, and calculating a transformation value (T value) based on the corrected second reference vector and a coordinate value of a feature point existing in the first image and a coordinate value of a feature point in the second image corresponding to the feature point.

The transformation value may include $T_x$ and $T_y$ values $$\begin{pmatrix} x' \\ y' \\ 1 \end{pmatrix} = RST \begin{pmatrix} x \\ y \\ 1 \end{pmatrix} = \begin{pmatrix} \cos\theta & \sin\theta & 0 \\ -\sin\theta & \cos\theta & 0 \\ 0 & 0 & 1 \end{pmatrix} \begin{pmatrix} S_x & 0 & 0 \\ 0 & S_y & 0 \\ 0 & 0 & 1 \end{pmatrix} \begin{pmatrix} 1 & 0 & T_x \\ 0 & 1 & T_y \\ 0 & 0 & 1 \end{pmatrix} \begin{pmatrix} x \\ y \\ 1 \end{pmatrix}$$

and may be calculated using the above Equation, and in the above Equation, $T_x$ and $T_y$ may represent values on x and y coordinate values of a T factor, θ may represent an angle between the first reference vector and the second reference vector, $S_x$ may represent a scale value on an x axis, $S_y$ may represent a scale value on a y axis, x and y values may represent a coordinate value of a feature point of the first image, and x' and y' values may represent a coordinate value of a feature point of the second image.

The reconstructing of the second content may include reconstructing the second content in association with at least one of a detection of identification information of the second content and a detection of a watermark included in the second content.

The calculating of the RST value may include generating a plurality of reference vector candidates in the plurality of images, calculating a plurality of RST values, respectively, based on the plurality of generated reference vector candidates, and determining the most redundant value among the calculated RST values as a final RST result value.

The method may further include detecting a watermark in the reconstructed second content.

The method may further include extracting a continuous feature code (CFC) from the reconstructed second content.

The first image and the second image may include an image having the larger number of feature points than the number of feature points.

The first image and the second image may include an image having resolution higher than a reference value.

In another aspect, an apparatus for reconstructing content image data is provided. The apparatus includes a point selection unit which selects a first point and a second point in a first image of first content and a third point and a fourth point in a second image of second content, the second image being an image corresponding to the first image and the third point and the fourth point being points in an image corresponding to the first point and the second point, respectively, a reference vector generation unit which generates a first reference vector using the first point and the second point and generates a second reference vector using the third point and the fourth point, an RST value calculation unit which calculates a rotation, scale, and transformation (RST) value from the first image to the second image using the first reference vector and the second reference vector, and a content reconstruction unit which reconstructs the second content using the calculated RST value.

The point selection unit may detect a plurality of feature points in the first image and the second image, select a plurality of feature points matched in the first image and the second image among the plurality of detected feature points, select the first point, the second point, the third point, and the fourth point among the plurality of selected feature points, and select two feature points, which are farthest from each other in the first image and the second image, respectively, among the plurality of selected feature points as the first point, the second point, the third point, and the fourth point.

The RST value calculation unit may calculate a plurality of RST values, respectively, based on a plurality of generated reference vector candidates in the plurality of images to determine the most redundant value among the calculated RST values as a final RST result value.

BRIEF DESCRIPTION OF THE DRAWINGS

FIG. 5 is a diagram illustrating an RST transform matrix.

FIG. 6 is a conceptual diagram for describing a method for calculating an R factor.

DESCRIPTION OF EXEMPLARY EMBODIMENTS

Figure 1:
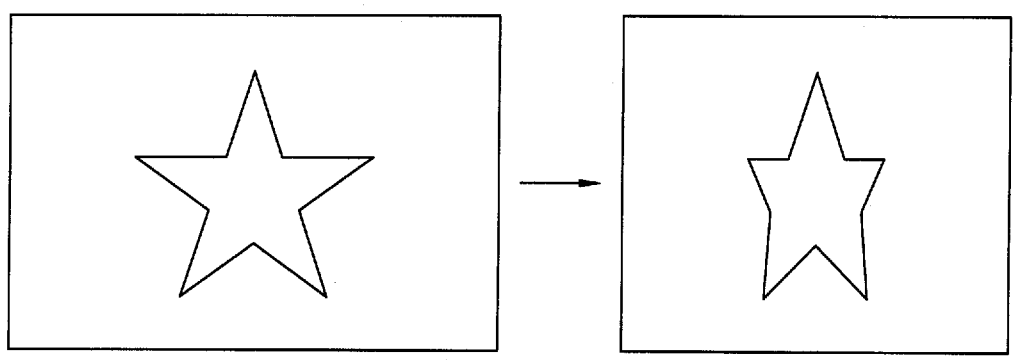
FIG. 1 is a diagram illustrating a situation in which image feature information is extracted in a state where original content is degraded during sharing.

The present invention may be variously modified and have several embodiments. Therefore, specific embodiments of the present invention will be illustrated in the accompanying drawings and be described in detail.

However, it is to be understood that the present invention is not limited to a specific embodiment, but includes all modifications, equivalents, and substitutions without departing from the scope and spirit of the present invention.

Terms used in the specification, 'first', 'second', etc., may be used to describe various components, but the components are not to be interpreted to be limited to the terms. The terms are used only to distinguish one component from another component. For example, a 'first' component may be named a 'second' component and the 'second' component may also be similarly named the 'first' component, without departing from the scope of the disclosure. A term 'and/or' includes a combination of a plurality of related described items or any one of the plurality of related described items.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element interposed therebetween.

Terms used in the present specification are used only in order to describe specific embodiments rather than limiting the present invention. Singular forms are intended to include plural forms unless the context clearly indicates otherwise. It will be further understood that the terms "comprises" or "have" used in this specification, specify the presence of stated features, steps, operations, components, parts mentioned in this specification, or a combination thereof, but do not preclude the presence or addition of one or more other features, numerals, steps, operations, components, parts, or a combination thereof.

Unless being defined otherwise, it is to be understood that all the terms used in the present specification including technical and scientific terms have the same meanings as those that are generally understood by those skilled in the art. It should be interpreted that terms defined by a generally used dictionary are identical with the meanings within the context of the related art, and they should not be ideally or excessively formally interpreted unless the context clearly dictates otherwise.

Hereinafter, embodiments of the present invention will be described in more detail with reference to the accompanying drawings. In order to facilitate the entire understanding of the present invention in describing the present invention, the same components will be denoted by the same reference numerals throughout the accompanying drawings, and an overlapped description for the same components will be omitted.

Figure 2:
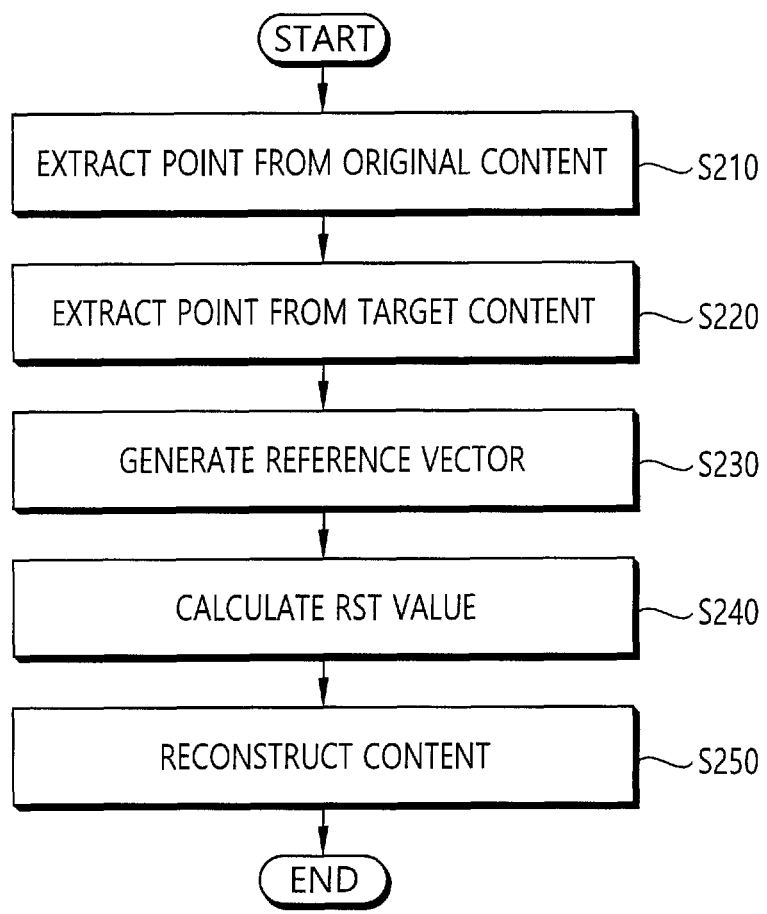
FIG. 2 is a flowchart schematically illustrating a method for reconstructing content image data according to an embodiment of the present invention.

FIG. 2 is a flowchart schematically illustrating a method for reconstructing content image data according to an embodiment of the present invention.

Referring to FIG. 2, a method for reconstructing content image data includes extracting two points from one image of an original content and also extracting two points from one image of target content by receiving the original content and the target content (S210 and S220). Here, the original content refers to a content having a state unique to the content, and the target content is content to be reconstructed and refers to a content which is degraded and deformed in resolution and/or image quality and the like from the original content. The original content and the target content are secured, and in particular, both contents do not have to be in a perfect state. The original content may be present partially, not entirely, and the target content may also be present partially, not entirely. For example, the reconstruction method according to the embodiment of the present invention can be utilized even in a situation where only 100 to 200 frames of a total of 2,000 frames exist in the original content and only 500 to 1,000 frames exist in the target content. However, in utilizing the reconstruction method according to the embodiment of the present invention, the corresponding frames may preferably exist in the original content and the target content. In addition, content may include video and an image.

In a reconstruction apparatus according to an embodiment of the present invention, a terminal may be referred to as a mobile station (MS), user equipment (UE), a user terminal (UT), a wireless terminal, an access terminal (AT), a terminal, a mobile subscriber unit, a subscriber station (SS), a cellular telephone, a wireless device, a wireless communication device, a wireless transmit/receive unit (WTRU), a mobile node, a mobile, a mobile station, a personal digital assistant (PDA), a smart phone, a laptop, a netbook, a personal computer, a wireless sensor, consumer electronics (CE), or other terms. Various embodiments of the reconstruction apparatus may include, but are not limited to, not only a cellular telephone, a smart phone having a wireless communication function, a personal digital assistant (PDA) having a wireless communication function, a wireless modem, a portable computer having a wireless communication function, a photographing device such as a digital camera having an image processing function, a gaming devices, music storage and playback home appliances, Internet home appliances, but also portable units or terminals incorporating combinations of these functions.

It is preferable that the image of the target content and an image of the target content which are to be extracted correspond to each other. That is, it is preferable to extract the corresponding points from the corresponding image by selecting an image having the same frame index. Here, the point can indicate a pixel in the corresponding image and coordinates of the pixel. It is also preferable that the extracted points are points corresponding to each other in the respective images of the original content and the target content. That is, it is preferable to obtain a first point to a fourth point from the original content and the target content so that the first point in the image of the original content corresponds to the third point in the video of the target content, and the second point in the image of the original content corresponds to the fourth point in the image of the target content. From the original content and the target content.

Then, one reference vector of each content, that is, a total of two reference vectors are generated based on two points extracted from the respective contents (S230). The reference vector is a reference vector for estimating how much the target content is deformed from the original content, and is a very important factor in calculating an RST value indicating the degree of deformation. Referring to the contents of the above embodiment, a first reference vector may be generated based on the first point and the second point obtained from the image of the original content, and a second reference vector may be generated based on the third point and the fourth point obtained from the image of the target content.

Then, the RST value is calculated based on the obtained two reference vectors, that is, the first reference vector and the second reference vector. The RST value is a value for correcting the geometrically deformed content. In this case, an R value may be a value indicating how much a rotation occurs, the an S value may be a value indicating how much scaling occurs, and a T value may be a value for calculating how much an actual specific point is deformed on a coordinate system.

After the RST value is calculated, an image for the RST deformation can be reconstructed (S250). Then, it is possible to find the exact position where a watermark message information image is embedded in the reconstructed image and then extract the watermark message information message. Then, a pattern of the extracted message image can be analyzed and decoded into '0' or '1' information. In this case, the message information may include an error correction code (ECC) and the like to enhance the reliability of the detected information. In addition, it is possible to obtain DNA information on the corresponding content by extracting a continuous feature code (CFC) from the reconstructed image.

Figure 3:
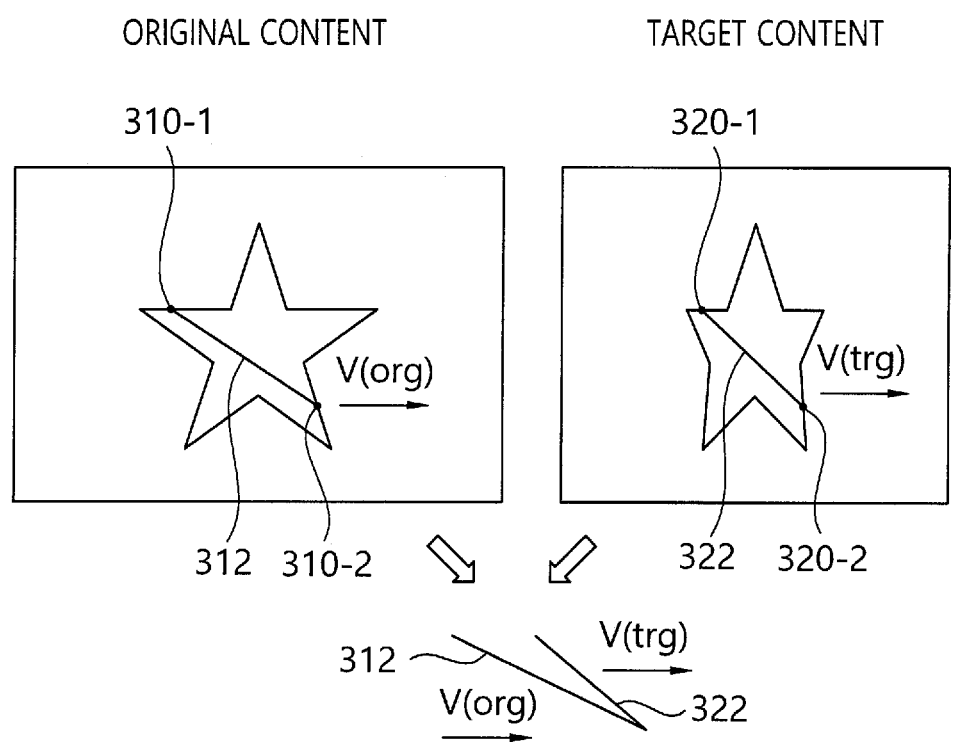
FIG. 3 is a conceptual diagram for describing a method for generating a reference vector using feature points in original content and target content.

FIG. 3 is a conceptual diagram for describing a method for generating a reference vector using feature points in original content and target content.

Referring to FIG. 3, the apparatus first checks whether there are corresponding frames in the original content and the target content. If the original content and the target content are a single image, the additional effort of finding the corresponding relationship can be reduced. It is only necessary to check whether the images of the original content and the target content are the same. In the case of video, since there are a plurality of frames, it is necessary to select the corresponding frames which have the same frame index, that is, indicate the same contents.

Then, feature points are selected in the image of the original content and the image of the target content which correspond to each other. The feature point may indicate a set of all points which indicate feature attributes distinguished from the rest points. The feature point may have radiometric or geometric information. For example, a contour of a specific object may be a feature point.

Then, it is determined whether the feature points are matched with each other in each image. That is, feature points existing only in any one of the image of the original content and the image of the target content, for example, feature points which are invisible due to the degradation or deformation in one of the image of the original content and the image of the target content are not matched with each other, and therefore fall out during the matching. Then, only the matched feature points are selected in both images. The matched feature points may all be candidates for generating the reference vector. Therefore, it is possible to generate one reference vector in each image by selecting any two points among the matched feature points. In this case, however, in order to generate a reference vector having a small calculation error, it is preferable to generate the reference vector by selecting two farthest points among the matched feature points.

In the embodiment of FIG. 3, a first feature point 310-1 and a second feature point 310-2 can be extracted from the original content. Likewise, a third characteristic point 320-1 and a fourth characteristic point 320-2 can be extracted from the target content. The four feature points 310-1, 310-2, 320-1, and 320-2 are the farthest feature points among the matched feature points in each image. That is, the first feature point 310-1 and the second feature point 310-2 are the farthest feature points in the image of the original content, and the third feature point 320-1 and the fourth feature point 320-2 are the farthest feature points in the target content.

A vector formed by the first feature point 310-1 and the second feature point 310-2 is referred to as a first reference vector 312 ($V_{org}$) and a vector formed by the third feature point 320-1 and the fourth feature point 320-2 may be a second reference vector 322 ($v_{trg}$). The reference vectors 312 and 322 have directivity. Here, it is preferable to compare both vectors in consideration of the directivity.

Figure 4:
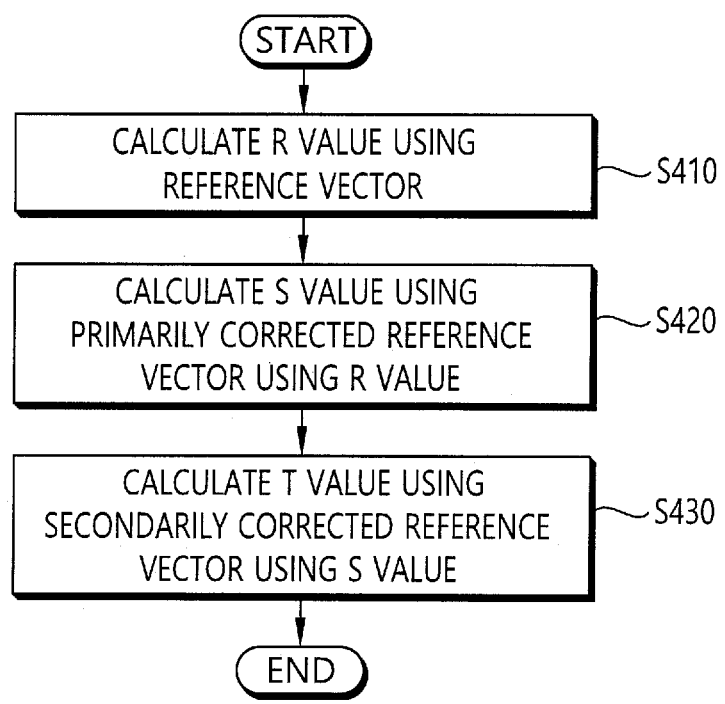
FIG. 4 is a flowchart illustrating in detail a method for calculating an RST value of the method for reconstructing content image data according to an embodiment of the present invention.

FIG. 4 is a flowchart illustrating in detail a method for calculating an RST value of the method for reconstructing content image data according to an embodiment of the present invention.

Referring to FIG. 4, the RST value may be calculated using two reference vectors generated in the above manner.

FIG. 5 is a diagram illustrating an RST transform matrix.

As illustrated in FIG. 5, it is preferable to obtain each component of the RST transform matrix which is applied from the original content to the target content from using two reference vectors. The R value can be expressed by a matrix value having cos θ and sin θ as terms using an angle θ between both reference vectors. The S value can be expressed by a matrix value having, as terms, $S_x$ and $S_y$ representing a scale-related proportional relationship on x and y coordinate systems. Finally, the T value can be expressed by a matrix value having $T_x$ and $T_y$ as a first rightmost term and a second rightmost term in a unit matrix. The RST value may be calculated based on coordinate values of the feature points (which includes feature points which form a reference vector but is not necessarily limited to the feature points of the reference vector, and other feature points in an image can be utilized) in the original content and coordinate values of the matched feature points (which also includes, but is not necessarily limited to, the feature points forming the reference vector) in the target content. The RST value can be defined using these three matrices.

Referring back to FIG. 4, first, the apparatus calculates an R value using the reference vector (S410). The R value is calculated by calculating an angle between both vectors by applying a scalar product operation using the reference vector.

Then, after the reference vector of the target content is corrected using the calculated R value to generate a primarily corrected reference vector, the S value is calculated using the reference vector of the original content and the primarily corrected reference vector (S420). The S value can be calculated by comparing a size of the two reference vectors on the x coordinate system and the y coordinate system.

Next, after a secondary correction is performed using the S value calculated in the primarily corrected reference vector of the target content, the T value is calculated using a coordinate of the secondarily corrected reference vector generated and a pair of matched feature points in the original and target contents (S430). Although the coordinate values of the feature points forming the reference vector of the original content and the coordinate values of the feature points (feature points matched with the feature points in the original content) Banning the reference vector of the target content are corrected by a secondarily corrected reference vector, the T value can be calculated based on a difference value occurring between both coordinates.

FIG. 6 is a conceptual diagram for describing a method for calculating an R factor.

Referring to FIG. 6, the apparatus concatenates between terminations of two reference vectors 612 and 622 previously generated to calculate an angle θ 630 between the two reference vectors 612 and 622. In this case, since the vector has directivity, it is preferable to calculate the angle 630 by attaching the terminations having no arrows to each other in consideration of the directivity. In this case, the scalar product operation of both reference vectors 612 and 622 may be applied, and the angle θ between the two reference vectors 612 and 622 is calculated using an equation which derives a value obtained by calculating the scalar product of the both reference vectors 612 and 622 and a cos θ value as a sum of a value obtained by multiplying x values of the both reference vectors 612 and 622 and a value obtained by multiplying y values of the both reference vectors 612 and 622.

As a result, the angle θ is calculated using the following Equation 1.

$$\cos\theta = \frac{x_{org}x_{trg} + y_{org}y_{trg}}{\sqrt{x_{org}^2 + y_{org}^2}\sqrt{x_{trg}^2 + y_{trg}^2}} \quad [\text{Equation 1}]$$

In the above Equation 1, θ represents the angle 630, $x_{org}$ represents the x value of the reference vector 612 of the original content, $y_{org}$ represents the y value of the reference vector 612 of the original content, $x_{trg}$ represents the x value of the reference vector 622 of the target content, and $y_{trg}$ represents the y value of the reference vector 622 of the target content.

Figure 7:
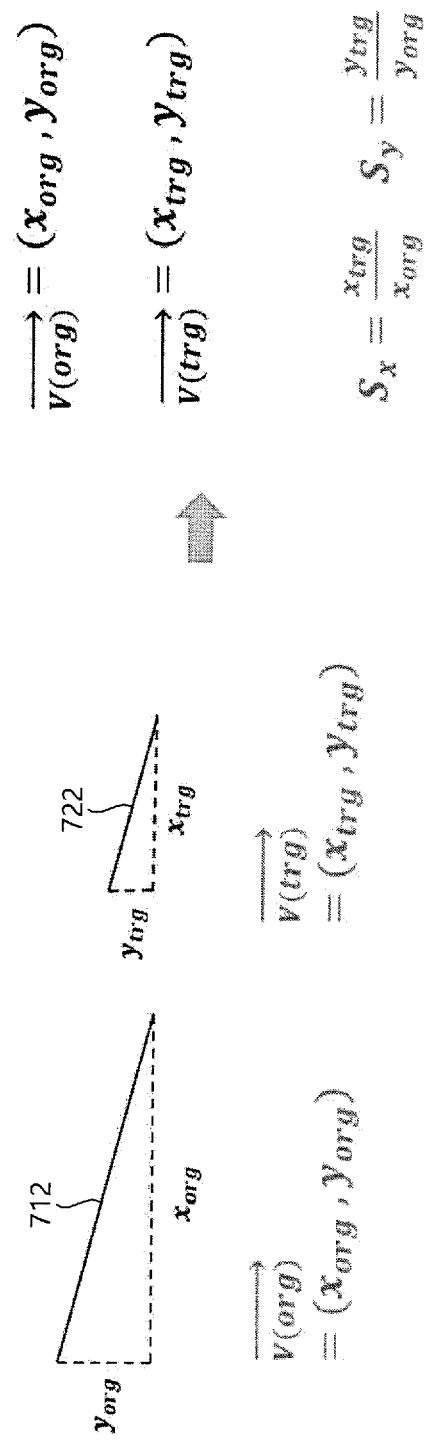
FIG. 7 is a conceptual diagram for describing a method for calculating an S factor.

FIG. 7 is a conceptual diagram for describing a method for calculating an S factor.

Referring to FIG. 7, the apparatus can calculate the S factor value using a reference vector 722 in which the direction of the reference vector of the target content is corrected using the calculated θ value. That is, after both reference vectors 712 and 722 are corrected in parallel using the θ value, a proportional relationship on an x axis and a proportional relationship on a y axis can be calculated by comparing the sizes of the reference vectors.

A proportional relationship $S_x$ on the x axis may be calculated by a ratio between the x value of the reference vector 712 of the original content and the x value of the primarily corrected reference vector 722 of the target content, and a proportional relationship $S_y$ on the y axis may be calculated by a ratio between the y value of the reference vector 712 of the original content and the y value of the primarily corrected reference vector 722 of the target content. This is represented by the following Equation 2.

$$S_x = \frac{x_{trg}}{x_{org}} \quad S_y = \frac{y_{trg}}{y_{org}} \qquad \text{[Equation 2]}$$

After the S factor value is calculated, the secondary correction is performed on the reference vector 722 of the primarily corrected target content by using the S factor value. Then, the $T_x$ and $T_y$ values are calculated using the secondarily corrected reference vector (not illustrated) of the target content. As described above, this can be calculated using the coordinate values of the feature points forming the reference vector of the original content and the coordinate values of the feature points forming the reference vector of the target content in an R matrix and an S matrix previously calculated.

This is calculated using the following Equation 3.

$$\begin{pmatrix} x' \\ y' \\ 1 \end{pmatrix} = RST \begin{pmatrix} x \\ y \\ 1 \end{pmatrix} = \begin{pmatrix} \cos\theta & \sin\theta & 0 \\ -\sin\theta & \cos\theta & 0 \\ 0 & 0 & 1 \end{pmatrix} \begin{pmatrix} S_x & 0 & 0 \\ 0 & S_y & 0 \\ 0 & 0 & 1 \end{pmatrix} \begin{pmatrix} 1 & 0 & T_x \\ 0 & 1 & T_y \\ 0 & 0 & 1 \end{pmatrix} \begin{pmatrix} x \\ y \\ 1 \end{pmatrix} \qquad \text{[Equation 3]}$$

In the above Equation 3, $T_x$ and $T_y$ represent the values of the x and y coordinate systems of the T factor, x and y values represent the coordinate values of the feature points in the original content, and x' and y' values represent the coordinate values of the matched feature points in the target content.

Figure 8:
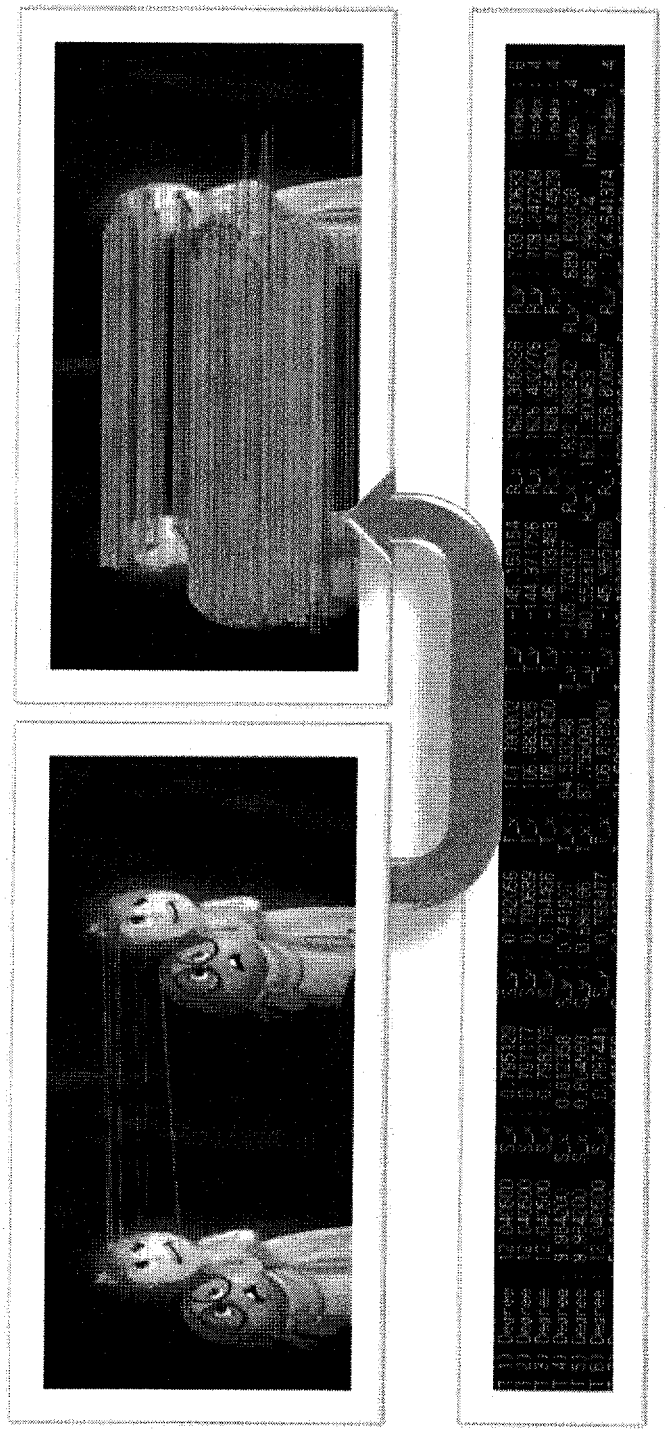
FIG. 8 is an exemplary diagram for describing a process of reconstructing degraded target content based on a calculated RST value.

FIG. 8 is an exemplary diagram for describing a process of reconstructing degraded target content based on a calculated RST value.

Referring to FIG. 8, as illustrated on the left side of the upper part of FIG. 8, values associated with an RST attack performed in the target content are calculated based on an RST value calculation program as illustrated in the lower part of FIG. 8 using the matched feature points in the corresponding images of the original content and the target content. Then, as illustrated on the right side of FIG. 8, all or a part of the frames of the target content is reconstructed by inversely using the calculated RST value.

Figure 9:
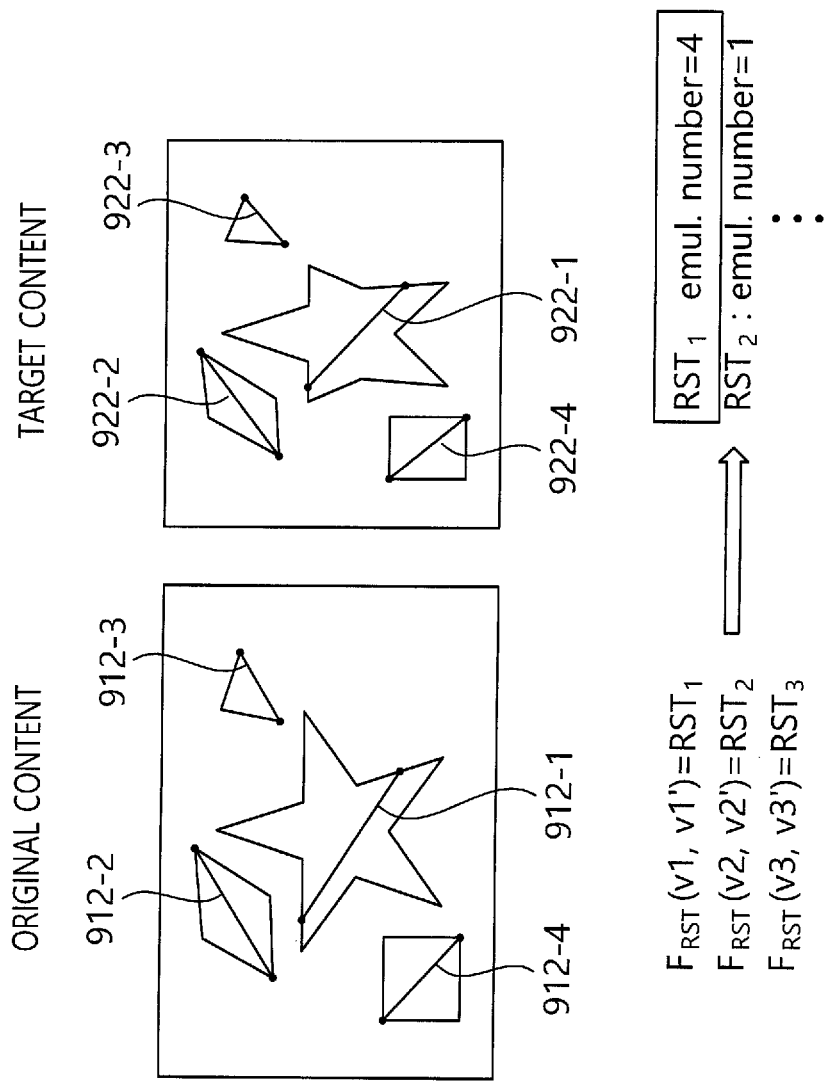
FIG. 9 is a conceptual diagram for describing a method for generating a plurality of reference vectors and correcting an error of an RST value according to another embodiment of the present invention.

FIG. 9 is a conceptual diagram for describing a method for generating a plurality of reference vectors and correcting an error of an RST value according to another embodiment of the present invention.

Referring to FIG. 9, in order to predict a RST matrix value approximating a correct answer, in another embodiment of the present invention, the apparatus may consider a method for generating various reference vectors of the original content and the target content, measuring the RST value, and predicting the most redundant value among the measured RST value as a result value. That is, after a plurality of reference vectors 912-1 to 912-4 are generated in the original content and a plurality of reference vectors 922-1 to 922-4 corresponding thereto are generated in the target content, the RST value is calculated based on each corresponding reference vector pair. After the RST value calculated using a first reference vector pair 912-1 and 922-1, the RST value calculated using a second reference vector pair 912-2 and 922-2, the RST value calculated using a third reference vector pair 912-3 and 922-3, and the RST value calculated using a fourth reference vector pair 912-4 and 922-4 are defined as $RST_1$, $RST_2$, $RST_3$, and $RST_4$, respectively, and calculated, the most redundant value in the $RST_1$, $RST_2$, $RST_3$, and $RST_4$ is used as a correct answer.

Figure 10:
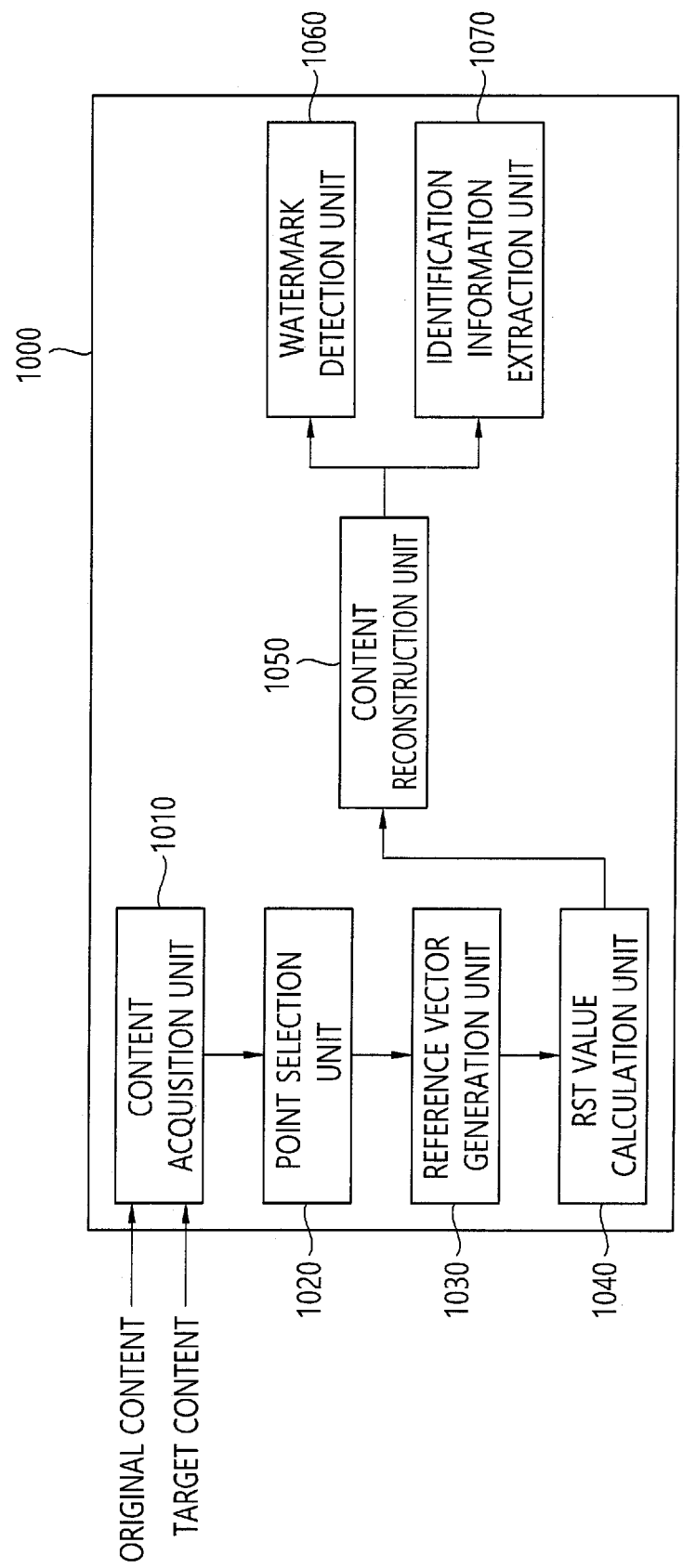
FIG. 10 is a block diagram schematically illustrating an apparatus for reconstructing content image data according to an embodiment of the present invention.

FIG. 10 is a block diagram schematically illustrating an apparatus for reconstructing content image data according to an embodiment of the present invention. As illustrated in FIG. 10, an apparatus 1000 for reconstructing content image data according to an embodiment of the present invention includes a content acquisition unit 1010, a point selection unit 1020, a reference vector generation unit 1030, an RST value calculation unit 1040, a content reconstruction unit 1050, a watermark detection unit 1060, and an identification information extraction unit 1070. Each component may be implemented in hardware, such as a microprocessor, for each functional block, and may be implemented as one or a plurality of microprocessors in combination of the functional blocks. In addition, instructions associated with the processor performed in each functional block may be stored in a memory (not illustrated).

Referring to FIG. 10, the content acquisition unit 1010 receives the original content and the target content. Then, the received original content and target content are provided to a point selection unit 1020.

The point selection unit 1020 extracts two points from one image of the original content and also two points from one image of the target content. The point selecting unit 1020 first checks whether there are the corresponding images in the two contents. Then, one of the corresponding images is selected. In this case, it is preferable to select a pair of images having best image quality. Also, it is preferable to select a pair of images having the largest number of matched feature points.

Then, the matched feature points existing in both images among the feature points existing in the pair of images are extracted. Then, a pair of feature points at the farthest position among the matched feature points is extracted from each image. Information on the extracted feature points is provided to the reference vector generation unit 1030.

The reference vector generation unit 1030 generates one reference vector of each content, that is, a total of two reference vectors based on two points extracted from both contents. The reference vector is a reference vector for estimating how much the target content is deformed from the original content, and is utilized to calculate an RST value indicating the degree of deformation.

The RST value calculation unit 1040 calculates an RST value based on the two reference vectors generated by the reference vector generation unit 1030. The RST value is a value for correcting the geometrically deformed content. In this case, it is preferable to first calculate the R value, secondly calculate the S value, and finally calculate the T value. Then, correcting the content by inversely applying the calculated factor to the reference vector of the target content before a next factor is calculated is a preferred method for more accurately calculating a factor value.

The RST value calculation unit 1040 calculates the R value represented by the matrix value having $\cos\theta$ and $\sin\theta$ as terms using the angle $\theta$ between both reference vectors. In this case, the R value may be calculated by using the scalar product operation to calculate the angle between both vectors. The S value may be expressed by the matrix value of $S_x$ and $S_y$ representing the scale-related proportional relationship on the x and y coordinate systems, and may be calculated by comparing the sizes of the primarily corrected reference vector of the target content with the reference vector of the original content based on the information on the x coordinate systems and the y coordinate systems of the both vectors.

Finally, the T value can be calculated based on the coordinate values of the feature values forming the reference vector of the original content and the feature points forming the reference vector of the target content.

The content reconstruction unit 1050 may reconstruct, to the original image, all or at least a part of images of the target content using the matrix calculated by the RST value calculation unit 1040 in association with the RST deformation. Then, the reconstructed image may be provided to the watermark detection unit 1060 and/or the identification information extraction unit 1070, respectively.

The watermark detection unit 1060 finds the accurate position where the watermark message information image is embedded, extracts the watermark message information image from the reconstructed image, analyzes the pattern of the extracted message image, and analyzes the pattern of the extracted message image, and decodes the analyzed pattern into '0' or '1' information, thereby detecting the watermark included in the corresponding content. In this case, the message information may include the error correction code (ECC) and the like to enhance the reliability of the detected information.

In addition, the identification information extraction unit 1070 can obtain the DNA information on the corresponding content by extracting the continuous feature code (CFC) from the reconstructed image.

Although the present invention has been described with reference to the drawings and the exemplary embodiments, it does not mean that the scope of the present invention is limited by the drawings and the exemplary embodiments and it may be understood by those skilled in the art that the present invention may be variously modified and altered without departing from the spirit and scope of the present invention described in the following claims.

According to the method for reconstructing content image data of the present invention, it is possible to protect the content in real time and provide an efficient file-based search service by efficiently reconstructing the content with the degraded resolution, image quality and the like.

What is claimed is:

1. A method for reconstructing content image data, the method comprising:
   selecting a first point and a second point in a first image of first content;
   selecting a third point and a fourth point in a second image of second content, the second image being an image corresponding to the first image and the third point and the fourth point being points in an image corresponding to the first point and the second point, respectively;
   generating a first reference vector using the first point and the second point;
   generating a second reference vector using the third point and the fourth point;
   calculating a rotation, scale, and transformation (RST) value from the first image to the second image using the first reference vector and the second reference vector; and
   reconstructing the second content using the calculated RST value,
   wherein the calculating of the RST value includes calculating a rotation value (R value) using a scalar product operation based on the first reference vector and the second reference vector,
   wherein the rotation value is calculated using an Equation 1 as follows $$\cos\theta = \frac{x_{org} x_{trg} + y_{org} y_{trg}}{\sqrt{x_{org}^2 + y_{org}^2}\sqrt{x_{trg}^2 + y_{trg}^2}},$$

and
   wherein in the Equation 1
      $\theta$ represents an angle between the first reference vector and the second reference vector,
      $x_{org}$ represents an x value of the first reference vector,
      $y_{org}$ represents a y value of the first reference vector,
      $x_{trg}$ represents an x value of the second reference vector, and
      $y_{trg}$ represents a y value of the second reference vector.

2. The method of claim 1, wherein
   the first point and the second point include a feature point characterizing an object in the first image, and
   the third point and the fourth point include a feature point characterizing an object in the second image.

3. The method of claim 1, wherein the selecting of the first point and the second point in the first image of the first content and the selecting of the third point and the fourth point in the second image of the second content include:
   detecting a plurality of feature points in the first image and the second image;
   selecting a plurality of feature points matched in the first image and the second image among the plurality of detected feature points; and
   selecting the first point, the second point, the third point, and the fourth point among the plurality of selected feature points.

4. The method of claim 3, wherein the selecting of the first point, the second point, the third point, and the fourth point among the plurality of selected feature points includes selecting two feature points, which are farthest from each other in the first image and the second image, respectively, among the plurality of selected feature points as the first point, the second point, the third point, and the fourth point.

5. The method of claim 1, wherein the calculating of the RST value includes:
   correcting the second reference vector based on the rotation value (R value) from the first image to the second image; and calculating a scale value (S value) based on a size of an x coordinate system and a size of a y coordinate system of the first reference vector and the corrected second reference vector.

6. The method of claim 5, wherein the scale value is calculated using $$S_x = \frac{x_{trg}}{x_{org}} \quad S_y = \frac{y_{trg}}{y_{org}},$$

and
in the above Equation, $S_x$ represents a scale value on an x axis, $S_y$ represents a scale value on a y axis, $x_{org}$ represents an x value of the first reference vector, $y_{org}$ represents a y value of the first reference vector, $x_{trg}$ represents an x value of the corrected second reference vector, and $y_{trg}$ represents a y value of the corrected second reference vector.

7. The method of claim 1, wherein the calculating of the RST value includes:
correcting the second reference vector based on the rotation value (R value) and the scale value (S value) from the first image to the second image; and
calculating the transformation value (T value) based on the corrected second reference vector and a coordinate value of a first feature point existing in the first image and a coordinate value of a second feature point in the second image corresponding to the first feature point.

8. The method of claim 1, wherein the transformation value includes $T_x$ and $T_y$ values of $$\begin{pmatrix} x' \\ y' \\ 1 \end{pmatrix} = RST \begin{pmatrix} x \\ y \\ 1 \end{pmatrix} = \begin{pmatrix} \cos\theta & \sin\theta & 0 \\ -\sin\theta & \cos\theta & 0 \\ 0 & 0 & 1 \end{pmatrix} \begin{pmatrix} S_x & 0 & 0 \\ 0 & S_y & 0 \\ 0 & 0 & 1 \end{pmatrix} \begin{pmatrix} 1 & 0 & T_x \\ 0 & 1 & T_y \\ 0 & 0 & 1 \end{pmatrix} \begin{pmatrix} x \\ y \\ 1 \end{pmatrix}$$

and is calculated using $$\begin{pmatrix} x' \\ y' \\ 1 \end{pmatrix} = RST \begin{pmatrix} x \\ y \\ 1 \end{pmatrix} = \begin{pmatrix} \cos\theta & \sin\theta & 0 \\ -\sin\theta & \cos\theta & 0 \\ 0 & 0 & 1 \end{pmatrix} \begin{pmatrix} S_x & 0 & 0 \\ 0 & S_y & 0 \\ 0 & 0 & 1 \end{pmatrix} \begin{pmatrix} 1 & 0 & T_x \\ 0 & 1 & T_y \\ 0 & 0 & 1 \end{pmatrix} \begin{pmatrix} x \\ y \\ 1 \end{pmatrix},$$

and
in the above Equation, $T_x$ and $T_y$ represent values on x and y coordinate values of a T factor, $\theta$ represents an angle between the first reference vector and the second reference vector, $S_x$ represents a scale value on an x axis, $S_y$ represents a scale value on a y axis, x and y values represent a coordinate value of a feature point of the first image, and x' and y' values represent a coordinate value of a feature point of the second image.

9. The method of claim 1, wherein the reconstructing of the second content includes reconstructing the second content in association with at least one of a detection of identification information of the second content and a detection of a watermark included in the second content.

10. The method of claim 1, wherein the calculating of the RST value includes:
generating a plurality of reference vector candidates in the plurality of images;
calculating a plurality of RST values, respectively, based on the plurality of generated reference vector candidates; and
determining the most redundant value among the calculated RST values as a final RST result value.

11. The method of claim 1, further comprising:
detecting a watermark in the reconstructed second content.

12. The method of claim 1, further comprising:
extracting a continuous feature code (CFC) from the reconstructed second content.

13. The method of claim 1, wherein the first image and the second image include an image having the larger number of feature points than the number of feature points.

14. The method of claim 1, wherein the first image and the second image include an image having resolution higher than a reference value.

15. An apparatus for reconstructing content image data, the apparatus comprising a microprocessor configured to:
select a first point and a second point in a first image of first content and a third point and a fourth point in a second image of second content, the second image being an image corresponding to the first image and the third point and the fourth point being points in an image corresponding to the first point and the second point, respectively;
generate a first reference vector using the first point and the second point and generates a second reference vector using the third point and the fourth point;
calculate a rotation, scale, and transformation (RST) value from the first image to the second image using the first reference vector and the second reference vector; and
reconstruct the second content using the calculated RST value,
wherein the calculating of the RST value includes calculating a rotation value (R value) using a scalar product operation based on the first reference vector and the second reference vector,
wherein the rotation value is calculated using an Equation 1 as follows $$\cos\theta = \frac{x_{org}x_{trg} + y_{org}y_{trg}}{\sqrt{x_{org}^2 + y_{org}^2}\sqrt{x_{trg}^2 + y_{trg}^2}},$$

and
wherein in the Equation 1
$\theta$ represents an angle between the first reference vector and the second reference vector,
$x_{org}$ represents an x value of the first reference vector,
$y_{org}$ represents a y value of the first reference vector,
$x_{trg}$ represents an x value of the second reference vector, and
$y_{trg}$ represents a y value of the second reference vector.

16. The apparatus of claim 15, wherein the microprocessor is further configured to:
detect a plurality of feature points in the first image and the second image,
select a plurality of matched feature points in the first image and the second image among the plurality of detected feature points,
select the first point, the second point, the third point, and the fourth point among the plurality of selected feature points, and
select two feature points, which are farthest from each other in the first image and the second image, respectively, among the plurality of selected feature points as the first point, the second point, the third point, and the fourth point.

17. The apparatus of claim 15,
wherein the RST value includes a plurality of RST values, and
wherein the microprocessor is further configured to calculate the plurality of RST values, respectively, based on a plurality of generated reference vector candidates in the plurality of images to determine the most redundant value among the calculated RST values as a final RST result value.

* * * * *